J. C. WETTERGREEN.
JOINT FOR MOTOR CAR SPRINGS AND OTHER USES.
APPLICATION FILED FEB. 27, 1914.

1,148,880.

Patented Aug. 3, 1915.

Witnesses:
Carl L. Choate.
Llewellyn Richards.

Inventor:
John C. Wettergreen,
by Emery Booth Janney Varney
Attys.

UNITED STATES PATENT OFFICE.

JOHN C. WETTERGREEN, OF MALDEN, MASSACHUSETTS.

JOINT FOR MOTOR-CAR SPRINGS AND OTHER USES.

1,148,880. Specification of Letters Patent. Patented Aug. 3, 1915.

Application filed February 27, 1914. Serial No. 821,562.

*To all whom it may concern:*

Be it known that I, JOHN C. WETTERGREEN, a citizen of the United States, and a resident of Malden, Massachusetts, have invented an Improvement in Joints for Motor-Car Springs and other Uses, of which the following description, in connection with the accompanying drawings, is a specification, like characters on the drawings representing like parts.

This invention relates to an anti-rattling pivotal connection, shown herein for purposes of illustration as employed for connecting the spring to the frame of a vehicle.

Figure 1:
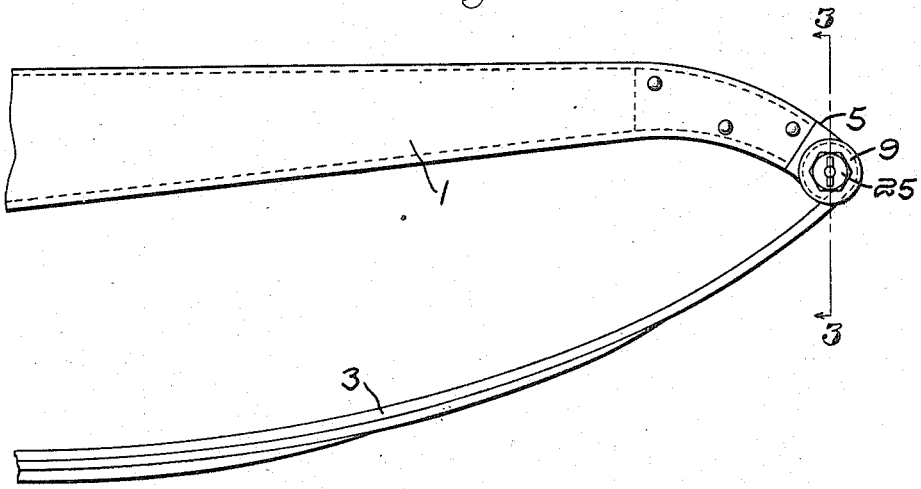
Figure 2:
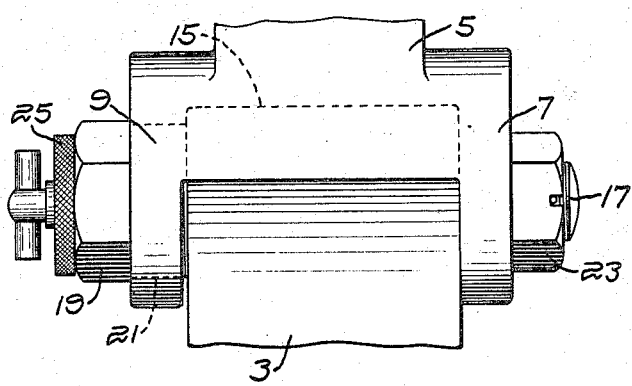
Figure 3:
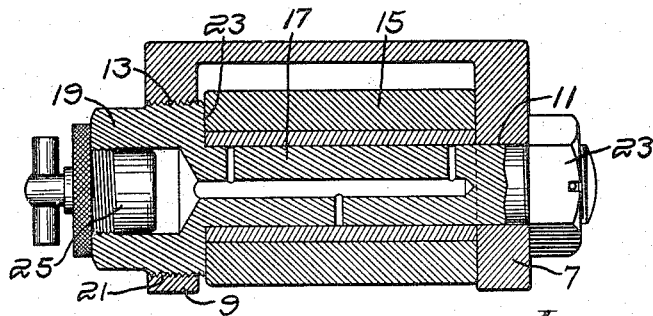

The character of the invention may be best understood by reference to the following description of an illustrative embodiment thereof shown in the accompanying drawing, wherein:

Figure 1 is a side elevation of a portion of the vehicle frame and spring equipped with a pivotal connection embodying the invention; Fig. 2 on an enlarged scale is an end elevation of the connection shown in Fig. 1; and Fig. 3 is a section taken on line 3—3 of Fig. 1.

Referring to the drawing, 1 designates a portion of a frame member of a chassis of an automobile and 3 a portion of a leaf spring. The pivotal connection of the spring with the frame member comprises a boss-like housing 5 having ears 7 and 9 provided with registering apertures 11 and 13 respectively, the latter preferably being substantially larger in diameter than the former for a purpose to be described. The spring is provided with an end which is bent over to form an eye 15 adapted to be received between said ears. A pivot pin or bolt 17 is entered through the apertures in said ears and eye. On one end of the bolt is a head 19 which is slabbed off to permit the ready application of a wrench. This head has a cylindrical extension 21 illustrated herein as threaded for engagement with corresponding threads in said aperture 13. The opposite end of the bolt has a smooth portion which passes through the smaller aperture and its end is threaded to receive a nut 23 adapted to be set up against the outer face of the ear adjacent thereto in order to secure the bolt in position.

The cylindrical portion of the head of the bolt is adapted to project through and beyond its aperture and present an end bearing face 23 for engagement with an end of the eye embracing the portion of the bolt between the ears. Thus when the bolt is tightened this face will act on said end and press the eye toward the opposite ear. By proper adjustment of the bolt a desirable pivotal fit between the parts may be provided without any lost motion or rattling. From time to time the bolt may be adjusted as may be necessary to take up wear and maintain a proper fit between the parts.

The threaded connection of the large diameter head with one of the apertures coöperates advantageously with the nut on the end of the bolt in preventing loosening of the nut and dislocation of the bolt. When the nut is tightened it acts through the shank of the bolt and draws the walls of the threads on said head tightly against the corresponding walls of the thread in the aperture. Since the head is of relatively large diameter surfaces of considerable extent are brought into tight frictional engagement and therefore likelihood of the loosening of the bolt is reduced to a minimum.

It will be understood that the cylindrical portion of the head might be smooth instead of threaded if desired and the shank might be threaded into the smaller aperture of the opposite ear if desired. The bolt may be provided with a lubricating device 25 of usual construction.

By my invention there is provided an extremely simple and effective pivotal connection whereby lost motion may be taken up and an anti-rattling fit provided. The device is compact and strong in construction and cheap to manufacture.

Having described one embodiment of the invention without limiting the same thereto, what I claim as new and desire to secure by Letters Patent is:

The combination of a chassis member with a spring member, one having ears and the other having an eye between said ears, one of said ears having a smooth bore, and the other having a larger threaded bore, a bolt having a large head threaded into the latter bore and a long cylindrical shank projecting from said head through said eye and said smooth bore, said head being formed to present a broad shoulder perpendicular to the axis of said bolt, a bushing sleeve between said eye and said bolt shank and a nut on the end of said shank to lock the same in position, said bolt head shoulder having provision for engaging ends of said eye and bushing to press opposite ends thereof against one of said ears to take up wear and lost motion with a minimum adjustment of said bolt.

In testimony whereof, I have signed my name to this specification, in the presence of two subscribing witnesses.

JOHN C. WETTERGREEN.

Witnesses:
ROBERT H. KAMMLER,
HENRY T. WILLIAMS.